(12) United States Patent
Nagato et al.

(10) Patent No.: US 6,430,026 B1
(45) Date of Patent: Aug. 6, 2002

(54) ELECTRODE MATERIAL FOR CAPACITORS AND CAPACITOR USING THE SAME

(75) Inventors: Nobuyuki Nagato; Kazumi Naito, both of Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/590,669

(22) Filed: Jun. 9, 2000

(30) Foreign Application Priority Data

Jun. 9, 1999 (JP) .......................................... 11-162082

(51) Int. Cl.$^7$ ............................................... H01G 4/008
(52) U.S. Cl. ................. 361/305; 361/306.1; 361/321.4; 361/334; 361/308.1; 438/240
(58) Field of Search ................................. 361/305, 433, 361/502, 503, 311, 321.2, 321.4, 321.5, 524, 523, 308.1; 438/240

(56) References Cited

U.S. PATENT DOCUMENTS

| | | | | |
|---|---|---|---|---|
| 3,597,664 A | * | 8/1971 | Villani | 317/230 |
| 4,032,417 A | * | 6/1977 | Peterson | 204/98 |
| 4,084,965 A | | 4/1978 | Fry | |
| 4,149,876 A | | 4/1979 | Rerat | |
| 4,448,493 A | * | 5/1984 | Matsudaria et al. | 350/357 |
| 4,633,373 A | * | 12/1986 | Phillips | 361/433 |
| 4,934,033 A | * | 6/1990 | Harakawa et al. | 29/25.03 |
| 4,954,169 A | | 9/1990 | Behrens | |
| 5,005,107 A | * | 4/1991 | Kobashi et al. | 361/540 |
| 5,171,379 A | * | 12/1992 | Kumar et al. | 148/422 |
| 5,180,699 A | * | 1/1993 | Terada et al. | 501/134 |
| 5,419,824 A | * | 5/1995 | Weres et al. | 204/268 |
| 5,441,670 A | * | 8/1995 | Shimamune et al. | 252/250 |
| 5,448,447 A | | 9/1995 | Chang | |
| 5,933,318 A | * | 8/1999 | Tomono et al. | 361/323 |
| 6,171,363 B1 | | 1/2001 | Shekhter et al. | |
| 6,215,652 B1 | * | 4/2001 | Yoshida et al. | 361/524 |
| 6,262,877 B1 | * | 7/2001 | Mosley | 361/306.2 |

FOREIGN PATENT DOCUMENTS

| | | |
|---|---|---|
| GB | 1 219 748 | 1/1971 |
| JP | 60-121207 | 6/1985 |
| JP | 3-150822 A | 6/1991 |
| JP | 5-9790 A | 1/1993 |
| WO | 98/19811 | 5/1998 |

OTHER PUBLICATIONS

Patent Abstracts of Japan (JP 2000–068160) Mar. 3, 2000.
"Reactions During Sintering of Niobium Powder from Aluminothermic Reduction Product," R&HM, Dec. 1985, vol. 4, pp. 189–194.
"The Influence of Gas Atmospheres on the First–Stage Sintering of High–Purity Niobium Powders," Metallurgical Transactions, Jun. 1984, vol. 15A, pp. 1111–1116.

* cited by examiner

*Primary Examiner*—Dean A. Reichard
*Assistant Examiner*—Nguyen Ha
(74) *Attorney, Agent, or Firm*—Sughrue Mion, PLLC

(57) ABSTRACT

The present invention provides an electrode material for capacitors, capable of ensuring a large capacitance per unit weight without worsening the leakage current property, and a capacitor using the material. The present invention also provides an electrode material for capacitors, obtained by reacting a tantalum metal and/or a niobium metal or an alloy thereof having an oxide film on the surface thereof with an alkali solution to form a tantalic acid compound and/or a niobic acid compound on the surface thereof. Furthermore, the present invention provides a capacitor using the electrode material.

18 Claims, No Drawings

ELECTRODE MATERIAL FOR CAPACITORS AND CAPACITOR USING THE SAME

FIELD OF THE INVENTION

The present invention relates to a novel electrode material for capacitors having a large capacitance per unit weight, a capacitor using the electrode material and a method for manufacturing the capacitor.

BACKGROUND OF THE INVENTION

Capacitors used for electronic instruments such as portable telephone and personal computer are demanded to have a small size and a large capacitance. Among these capacitors, a tantalum capacitor is preferred because it has a large capacitance for the size and exhibits good performance. In this tantalum capacitor, a sintered body of powdered tantalum is generally used for the anode moiety. Also, a sintered body using niobium is being studied as a material having a larger dielectric constant than that of tantalum. On such a sintered body, an oxide layer to work as a dielectric material is formed by an electrolytic oxidation process commonly used in conventional techniques to obtain a capacitor.

On the other hand, in JP-A-63-34917 (the term "JP-A" as used herein means an "unexamined published Japanese patent application") describes a method for manufacturing a capacitor having a large capacitance, where a metal foil or bar having pores or empty spaces is reacted in an alkali solution to form a perovskite oxide layer directly on the metal electrode material (hereinafter referred to as a "direct reaction method"), and also describes a capacitor using the oxide layer as a dielectric material.

These capacitors manufactured by a conventional method using an electrode material such as tantalum or niobium, or capacitors using as a dielectric material a perovskite acid compound formed by a direct reaction method have the following problems and cannot satisfactorily respond to the requirement for a larger capacitance.

In the case where a dielectric material oxide film of a capacitor is formed by an electrolytic oxidation method commonly used in conventional techniques, the oxide film for the dielectric material must be formed as an "ultra"-thin film so as to obtain a larger capacitance. However, when an "ultra"-thin film is formed, a leakage current is generated as a serious problem in the thinner film part, therefore, the "ultra"-thin film cannot be used in practice and in turn a larger capacitance cannot be obtained.

The direct reaction method of forming an acid compound film as a dielectric material having a larger dielectric constant cannot produce an acid compound of tantalum or niobium.

Furthermore, when an acid compound film is directly formed using other metals as an electrode material by the direct reaction method commonly used in conventional techniques, the dielectric film formed is uneven in the thickness and the thin part gives rise to the generation of leakage current, therefore, the thickness of this part must be increased as large as to reduce the leakage current to a predetermined value or lower. As a result, the average layer thickness of the film as a whole increases and a larger capacitance cannot be obtained.

In addition, as a problem in the production, when this reaction method is contained in the production process, the raw material solution for the reaction is entirely reacted, therefore, a batch processing of exchanging the raw material solution on each operation is enforced and the productivity decreases.

The present invention has been made to solve the above-mentioned problems. By using the electrode material for capacitors disclosed in the present invention, a capacitor having a large capacitance per unit weight can be obtained without worsening the leakage current characteristic value of the capacitor.

SUMMARY OF THE INVENTION

As a result of extensive investigations, the present inventors have succeeded in developing an electrode material for capacitors having an extremely large capacitance per unit weight without particularly reducing the entire thickness of the dielectric material, and have accomplished the present invention. More specifically, 1) the first invention to solve the above-described problems is an electrode material for capacitors, comprising a tantalum metal and/or a niobium metal having on the surface thereof a tantalic acid compound and/or a niobic acid compound formed by reacting an oxide of the tantalum metal and/or niobium metal formed on the surface of the metal in an alkali solution (for example, an alkali solution containing an alkali metal compound and/or an alkaline earth metal compound); the "tantalum metal and/or niobium metal" as used herein include tantalum metal, niobium metal and tantalum-niobium composite metal and the "oxide of a tantalum metal and/or a niobium metal" as used herein include an oxide of tantalum, an oxide of niobium and an oxide of tantalum-niobium composite metal;

2) the second invention to solve the above-described problems is the electrode material for capacitors as described in 1), wherein the oxide on the surface of a tantalum metal and/or a niobium metal is formed by the electrolytic oxidation using the tantalum metal and/or niobium metal as an anode;

3) the third invention to solve the above-described problems is an electrode material for capacitors, comprising a tantalum metal and/or a niobium metal having on the surface thereof a tantalic acid compound and/or a niobic acid compound formed by the electrolytic oxidation of the tantalum metal and/or niobium metal in an alkali solution (for example, an alkali solution containing an alkali metal compound and/or an alkaline earth metal compound); the "tantalum metal compound and/or niobium metal compound" as used herein include a tantalic acid compound, a niobic acid compound and a composite material of a tantalic acid compound and a niobic acid compound;

4) the forth invention to solve the above-described problems is an electrode material for capacitors, comprising a tantalum metal and/or a niobium metal having on the surface thereof a dielectric layer comprising an oxide of the tantalum metal and/or niobium metal, and a tantalic acid compound and/or a niobic acid compound;

5) the fifth invention to solve the above-described problems is the electrode material for capacitors as described in any one of 1) to 4), wherein the metal is a sintered body;

6) the sixth invention to solve the above-described problems is the electrode material for capacitors as described in any one of 1) to 4), wherein the tantalum metal and/or niobium metal is an alloy consisting of tantalum and/or niobium and at least one element selected from the group consisting of Group 3A elements, Group 4A elements, Group 3B elements, Group 4B elements and Group 5B elements in the Periodic Table;

7) the seventh invention to solve the above-described problems is an electrode material for capacitors, comprising an alloy having on the surface thereof a dielectric layer comprising an oxide of the elements constituting the alloy and a tantalic acid compound and/or a niobic acid compound, the alloy consisting of tantalum and/or niobium and at least one element selected from Group 3A elements, Group 4A elements, Group 3B elements, Group 4B elements and Group 5B elements in the Periodic Table;

8) the eighth invention to solve the above-described problems is the electrode material for capacitors as described in 6) or 7), wherein the alloy is a sintered body;

9) the ninth invention to solve the above-described problems is a capacitor comprising the electrode material described in any one of 1) to 8) as one part electrode having formed thereon a dielectric layer, and the other part electrode.

DETAILED DESCRIPTION OF THE INVENTION

The dielectric layer of the electrode material for capacitors of the present invention is a dielectric material containing at least a tantalic acid compound and/or a niobic acid compound, which, for example, (1) comprises a tantalic acid compound and/or a niobic acid compound or (2) has a two-layer structure consisting of an oxide of a tantalum metal and/or a niobium metal or an alloy thereof, and a tantalic acid compound and/or a niobic acid compound.

In the latter case, the two-layer structure of the dielectric material can be regarded as the state such that two kinds of dielectric materials are standing in series. In this case, the dielectric constant of a dielectric material having a small dielectric constant, namely, an oxide of a tantalum metal and/or a niobium metal or an alloy thereof, is deemed to determine the total dielectric constant. This oxide can be more reduced in the thickness as compared with conventional one-layer structure dielectric materials comprising an oxide alone, therefore, a capacitor using the electrode material having the structure of the present invention can have a larger capacitance per unit weight than conventional one-layer structure dielectric materials. Moreover, the total thickness of two layers in the structure is the thickness of the entire dielectric material, therefore, the leakage current property of the capacitor can be prevented from worsening.

In the former case, the tantalic acid compound and/or niobic acid compound can have a dielectric constant by far larger than the dielectric constant of the oxide film of a tantalum metal and/or a niobium metal, therefore, by using the electrode material comprising such a compound, a capacitor having a large capacitance can be obtained.

Furthermore, the oxide film having a uniform layer thickness formed by the electrolysis is displaced by an acid compound film, therefore, a uniform and thin acid compound film can be obtained and in turn the capacitance can be increased without causing any worsening of the leakage current.

In addition, the acid compound film having a uniform layer thickness formed by the electrolysis can be directly produced, therefore, the capacitance can be increased without causing any worsening of the leakage current.

One practical embodiment for obtaining the electrode material for capacitors of the present invention is described below.

The tantalum metal and/or niobium metal used in the present invention, or the alloy of a tantalum metal and/or a niobium metal, which is described later, can have any shape of foil, sheet or bar. A sintered body molded from the powder of tantalum and/or niobium or an alloy thereof may also be used. In the case of foil, sheet or bar, for the purpose of increasing the surface area, an etching treatment may be performed in the area from the surface to the center or to a predetermined position in the inside using a conventionally known method such as electrolysis etching.

The above-described sintered body can be manufactured, for example, from a powder (average particle size: 0.5 to 10 $\mu$m) obtained from a tantalum metal and/or a niobium metal or an alloy thereof which is described later. In order to obtain this powder, hydrogen may be introduced into the metal or alloy to pulverize it by making use of the hydrogen brittleness. The pulverization may be performed by a conventionally known method such as ball mill or jet mill. The pulverization may also be performed in a wet system using a solvent such as water or alcohol. In addition, the pulverization may be performed in an atmosphere using an inert gas such as argon or nitrogen.

One example of the method for producing a sintered body from the powder is described below, however, the production method of the sintered body is by no means limited to this example.

The powder is press-molded into a prescribed shape and then heated under a pressure of 1 to $10^{-5}$ Torr for several minutes to several hours at a temperature determined taking account of the particle size of the powder or the melting point of the alloy, for example, from 400 to 2,000° C., preferably from the standpoint of reducing the heating cost or maintaining the strength of the sintered body to a certain degree, from 500 to 1,500° C., thereby obtaining a sintered body.

The metal or alloy may be partially nitrided, for example, by a method of heating it in nitrogen at the stage of a prescribed form, at the stage of powder, at the stage after the molding or at the stage after the sintering.

For the nitriding treatment, for example, a method disclosed in JP-A-10-242004 filed by the present inventors may be used. By partially nitriding the metal or alloy, the capacitor manufactured using the material can be improved in the leakage current property.

The alloy used in one practical embodiment of the present invention is preferably an alloy consisting of tantalum and/or niobium and at least one element selected from Group 3A elements (Sc, Y, lanthanide, actinide), Group 4A elements (Ti, Zr, Hf), Group 3B elements (B, Al, Ga, In, Tl), Group 4B elements (C, Si, Ge, Sn, Pb) and Group 5B elements (N, P, As, Sb, Bi) in the Periodic Table. The ratio of tantalum or niobium in the alloy is preferably from 15 to 98 mol %, more preferably from the standpoint of obtaining a larger capacitance, from 50 to 93 mol %. If the ratio is less than 15 mol %, when a capacitor is manufactured using the alloy, the capacitor cannot have a large capacitance per unit weight as expected, whereas if it exceeds 98 mol %, segregation of slight metals easily occurs to make it difficult to obtain an alloy. The alloy can be manufactured by a conventional known method such as arc dissolution method.

The oxide of a tantalum metal and/or a niobium metal or an alloy thereof can be formed, for example, in an oxidizing atmosphere or by the electrolytic oxidation in an electrolytic solution. For forming the oxide in an oxidizing atmosphere, for example, oxidation in air, oxidation with oxygen gas or oxidation with an oxidizing agent may be used. The oxidizing agent may be an inorganic oxidizing agent or an organic oxidizing agent and examples thereof include persulfates such as hydrogen peroxide, ammonium persulfate, potassium persulfate and sodium persulfate, perphosphates such as ammonium perphosphate and potassium perphosphate, peracetic acid, and hydroxy peroxide. In the case of forming an oxide using such an oxidizing agent, the oxidizing agent is dissolved in water or a polar organic solvent such as alcohol and dimethylformamide, and then the metal or alloy is dipped in the solution to form an oxide.

For forming the oxide in an oxidizing atmosphere, oxidation in air, oxidation with oxygen gas and oxidation with an oxidizing agent may be used in combination. Also, two or more oxidizing agents may be used in combination.

For forming the oxide by the electrolytic oxidation in an electrolytic solution, an electric current is passed between the metal or an alloy thereof acting the part of anode and an appropriate cathode which is corrosion-resistant against the electric solution and has high conductivity, through an electrolytic solution by a constant voltage method, a constant current method, a pulse method or a combination of these methods, thereby forming the oxide. The electrolytic solution may be a conventionally known electrolytic solution, for example, a solution in which an inorganic acid such as sulfuric acid, hydrochloric acid or phosphoric acid, or an organic acid such as benzoic acid or adipic acid, is dissolved.

The oxide may also be manufactured using the method of forming an oxide in an oxidizing atmosphere and the method of forming an oxide by the electrolytic oxidation in combination.

Examples of the thus-formed oxide include, in the case of using the above-described metal, $Ta_2O_5$, $TaO_n$ (n is a positive number of less than 2.5), $Nb_2O_5$, $NbO_m$ (m is 2 or 1) and a composition thereof. In the case of using the above-described alloy, examples of the oxide include oxides containing the elements in each alloy composition.

The tantalic acid compound and/or niobic acid compound formed on the surface of the electrode material for capacitors of the present invention is a compound comprising a tantalic acid and/or a niobic acid and a Group 3A element such as alkali metal element, alkaline earth metal or lanthanide, or a compound comprising at least one element selected from Group 3A elements, Group 4A elements, Group 3B elements, Group 4B elements and Group 5B elements in the Periodic Table, an acid of an alloy consisting of tantalum and/or niobium (the acid of these alloys is also a tantalic acid and/or niobic acid in a broad meaning, therefore, the "tantalic acid and/or niobic acid" referred to in the present invention includes the acid of these alloys) and a Group 3A element such as an alkali metal element, an alkaline earth metal or lanthanide. The tantalum or niobium in the tantalic acid and/or niobic acid may have a valence of 4 or 5, or those having respective valences may be present in combination.

Examples of the tantalum acid compound and/or niobic acid compound include a perovskite compound. The perovskite compound has a high dielectric constant and exhibits excellent properties as a dielectric material, such as stability, therefore, when a capacitor is manufactured using this material, the capacitor obtained can have large capacitance per unit weight, good withstand voltage and in turn high leakage current property. Also, the dielectric constant can be elevated by molding and then sintering the dielectric material and thereby increasing the crystallinity. In the case when the dielectric material used is in the amorphous state or in the low crystallinity state, the capacitor manufactured using it exhibits good leakage current property.

A dielectric layer containing a tantalic acid compound and/or a niobic acid compound cannot be formed by the conventional direct reaction method but can be formed by the method disclosed in the present invention.

In the present invention, for forming a tantalic acid compound and/or a niobic acid compound directly on the surface of a tantalum metal and/or niobium metal or an alloy thereof, a method of electrolytically oxidizing the tantalum metal and/or niobium metal or an alloy thereof in an alkali solution containing an alkali metal compound and/or an alkaline earth metal compound, may be used. By controlling the conditions in the electrolytic oxidation, an acid compound can be formed on the surface of the tantalum metal and/or niobium metal or an alloy thereof to have any arbitrary film thickness, so that the dielectric layer can be manufactured to have a sufficiently thin single-layer structure of a tantalic acid compound and/or niobic acid compound.

Also, a method of reacting the tantalum metal and/or niobium metal or an alloy thereof having formed on the surface thereof an oxide in an alkali solution containing an alkali metal compound and/or an alkaline earth metal compound, may be used. By controlling the reaction conditions, the oxide of the tantalum metal and/or niobium metal or an alloy thereof can be freely allowed either to wholly surrender to an acid compound or to partially remain on the surface of the tantalum metal and/or niobium metal or an alloy thereof, so that the dielectric layer can be manufactured to have a sufficiently thin two-layer structure consisting of an oxide layer and a tantalic acid compound and/or niobic acid compound layer.

The film thickness of the dielectric layer is the thickness of the acid compound in the former case and the total thickness of two layers of the oxide and the acid compound in the latter case. With a dielectric layer having a large thickness, a capacitor having high withstand voltage can be obtained, and with a dielectric layer having a small thickness, a capacitor having high capacitance can be obtained. Therefore, the film thickness is preferably controlled by a preliminary test according to the purpose of a capacitor manufactured.

For example, in the case where the dielectric layer is formed at 20 [V], the acid compound dielectric material as a whole may be formed to have a film thickness of 500 to 1,000 Å which is sufficiently small for obtaining a larger capacitance.

Also, in the latter case where the dielectric layer has a two-layer structure, these two layers are disposed in series, therefore, when the oxide layer is extremely thin, the capacitor manufactured can have a large capacitance due to the small thickness of the oxide layer though the dielectric constant as a whole is determined by the dielectric constant of the oxide layer. In other cases, the acid compound is responsible for the entire dielectric constant and the capacitor manufactured can have a large capacitance.

For example, in the case where the dielectric layer is formed at 20 [V], the thickness of the dielectric material as a whole is from 500 to 1,000 Å and in the two-layer structure, the oxide film can be formed to have a thickness of 5 to 100 Å which is sufficiently small for obtaining larger capacitance.

The composition and thickness of each dielectric layer vary depending on the reaction temperature, reaction time and pH of the reaction solution at the formation of the dielectric layer, or the applied voltage and applied current density at the electrolysis, therefore, the conditions are preferably determined by a preliminary test and appropriately selected according to the purpose.

The method for manufacturing an alkali solution containing an alkali metal compound and/or an alkaline earth metal compound and the method for forming a dielectric layer, which are used in the manufacture of the electrode material for capacitors of the present invention, are further described below. The alkali solution may be similarly prepared whichever is used, a tantalum metal and/or niobium metal, an alloy thereof or a sintered body thereof.

The alkali solution containing an alkali metal compound and/or an alkaline earth metal compound is an alkaline solution in which a part or the whole of a compound containing at least one alkali metal element and/or alkaline earth metal element is dissolved. The pH of this solution is preferably from 10 to 14 and more preferably from the standpoint of increasing the reactivity, from 12 to 14. If the pH is excessively low, the reactivity into a tantalic acid compound and/or niobic acid compound or the stability of the reaction product disadvantageously decreases. In the case where the pH is low after only the above-described compound is dissolved or where the solubility of the compound is low, the pH of the solution before use may be adjusted using a strong alkali compound in combination. The solvent for the alkali solution is usually water but a polar solvent such as alcohol may also be used.

Examples of the compound containing an alkali metal element include a hydroxide, an oxide, a alcholate and a weak acid salt of the elements belonging to Group 1A in the Periodic Table (Li, Na, K, Rb, Cs and Fr).

In the present invention, the alkaline earth metal element is defined as the element belonging to Group 2A (Be, Mg, Ca, Sr, Ba and Ra) or Group 2B (Zn, Cd and Hg) of the Periodic Table. Examples of the compound containing an alkaline earth metal element include a hydroxide, an oxide, an alcholate and a weak acid salt of these elements. In the case of using a weak acid salt as the compound containing an alkaline earth metal element, a modified alkali such as sodium hydroxide or potassium hydroxide may be used in combination. In the case of using a compound containing an alkaline earth metal element having a low solubility, a saturated solution of the compound may be prepared and used or a suspension of the powdered oxide or hydroxide of the compound may be used. In the case of using a suspension of the powder, a design of preventing the contact of the powder with the metal or an alloy thereof must be made so as not to allow the powder to clog the pores of the dielectric layer under formation on the surface of the tantalum metal and/or niobium metal or an alloy thereof and thereby inhibit the reaction in the inside of the pore. For example, the metal or an alloy thereof is dipped in a supernatant portion of the solution and only the supernatant portion is stirred while taking care not to blow up the precipitated powder. Also, a filter may be interposed between the supernatant portion and the precipitated powder so as to prevent the invasion of the precipitated powder.

In the case of forming the dielectric layer in an alkali solution containing an alkali metal compound and/or an alkaline earth metal compound, the reaction is preferably performed in a gas atmosphere such as oxygen gas, nitrogen gas or argon gas, so that the reaction with carbon dioxide in air to cause the lowering of the pH of the solution, production of precipitates, mixing of a carbonate compound into the dielectric layer or the like can be prevented.

The reaction for forming the dielectric layer may be performed at a reaction temperature of 30 to 250° C., however, if the reaction temperature exceeds the boiling point of the solvent, the reaction is preferably performed in an applied pressure system. For example, when the reaction is performed using water as the reaction solvent under an atmospheric pressure, the dielectric layer is preferably formed at 30 to 98° C., preferably 60 to 95° C. from the standpoint of increasing the solubility and preventing the evaporation of water.

Examples of the method for forming a dielectric layer by the electrolytic oxidation in an alkali solution containing an alkali metal compound and/or alkaline earth metal compound include a method of passing an electric current between the tantalum metal and/or the niobium metal or an alloy thereof acting the part of anode and an appropriate cathode which is corrosion-resistant against the electrolytic solution and has a high dielectric constant, through an electrolytic solution by a constant voltage method, a constant current method, a pulse method or a combination of these methods.

In the method for forming the dielectric layer by the electrolytic oxidation in an alkali solution containing a alkali metal compound and/or alkaline earth metal compound, the alkali metal compound and/or alkaline earth metal compound is consumed only in an amount necessary for the electrolytic oxidation, therefore, the reaction of the entire raw material solution for the reaction does not proceed. Thus, the raw material solution needs not be exchanged on each operation, the dielectric layer can be continuously formed, and the batch processing is not necessary.

A capacitor can be manufactured using the thus-obtained electrode material for capacitors as one part electrode having formed thereon a dielectric layer, by combining it with the other part electrode.

In the present invention, the other part electrode of the capacitor is not particularly limited and examples thereof include at least one compound selected from an electrolytic solution, an organic semiconductor and an inorganic semiconductor, which are all well-known in the aluminum electrolytic capacitor industries. Specific examples of the electrolytic solution include a dimethylformamide and ethylene glycol mixed solution having dissolved therein 5 wt % of isobutyltripropylammonium borotetrafluoride electrolyte, and a propylene carbonate and ethylene glycol mixed solution having dissolved therein 7 wt % of tetraethylammonium borotetrafluoride.

Specific examples of the organic semiconductor include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer represented by the following formula (1) or (2). Specific examples of the inorganic semiconductor include an inorganic semiconductor mainly comprising lead dioxide or manganese dioxide, and an inorganic semiconductor comprising tri-iron tetroxide. These semiconductors may be used individually or in combination of two or more thereof.

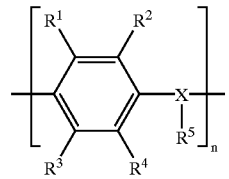
(1)

-continued

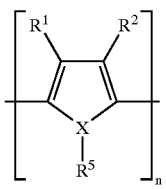
(2)

wherein $R^1$, $R^2$, $R^3$ and $R^4$, which may be the same or different, each represents hydrogen, an alkyl group having from 1 to 6 carbon atoms or an alkoky group having from 1 to 6 carbon atoms, X represents oxygen, sulfur or nitrogen atom, and $R^5$, which is present only when X is nitrogen atom, represents hydrogen or an alkyl group having from 1 to 6 carbon atoms. $R^1$ and $R_2$, and $R^3$ and $R^4$ in respective pairs may combine with each other to form a ring. Examples of the polymers represented by formulae (1) and (2) include polyaniline, polyoxyphenylene, polyphenylene sulfide, polythiophene, polyfuran, polypyrrole, polymethylpyrrole and derivatives of these polymers.

When an organic or inorganic semiconductor having an electrical conductivity of $10^{-2}$ to $10^3$ [S·cm$^{-1}$] is used, the capacitor manufactured can be more reduced in the impedance value and more increased in the capacitance at a high frequency.

Furthermore, when the other part electrode is a solid, a carbon paste and a silver paste are formed in this order on the other part electrode and this laminate is sealed with a material such as epoxy resin to form a capacitor. The capacitor may have a niobium or tantalum lead integrally molded with the electrode material for capacitors or welded before and after that. In the case where the other part electrode is a liquid, the capacitor constructed by those two electrodes is housed, for example, in a can electrically connected to the other part electrode to form a capacitor. In this case, the capacitor is designed such that the electrode side of the electrode material for capacitors is brought out to the outside through the niobium or tantalum lead and at the same time, insulated by an insulating rubber from the can.

As described in the foregoing pages, when the electrode material for capacitors manufactured by the present invention is used in a capacitor, the capacitor obtained can have a large capacitance per unit weight without worsening the leakage current property value of the capacitor.

BEST MODE FOR CARRYING OUT THE INVENTION

Specific embodiments of the present invention are described in greater detail below.

The electrode material for capacitors manufactured in the Examples was evaluated by the value of capacitance measured at 120 Hz in the condition such that the material was dipped in a 30% sulfuric acid at room temperature. The leakage current value of the manufactured capacitor was a value after continuously applying a voltage of 4[V] for 1 minute at room temperature. The capacitance was a value determined at room temperature and 120 Hz. The kind of the element present in the dielectric layer was identified by the Auger analysis.

EXAMPLE 1

A tantalum foil (thickness: 0.12 mm, size: 10 mm×10 mm) was thoroughly washed with hydrofluoronitric acid (a mixture of hydrofluoric acid and nitric acid) and repeatedly washed with ion exchange water. This foil as an anode was dipped in an aqueous 0.1% phosphoric acid solution and using platinum as a cathode, an electrolytic formation was performed by applying a voltage of 10[V] for 30 minutes at 80° C. After the completion of electrolytic formation, the formed product was thoroughly washed with ion exchange water from which carbon dioxide was removed by the boiling. Separately, in a Teflon-made container, strontium hydroxide high-purity crystal and barium hydroxide high-purity crystal were each dissolved in 100 ml of ion exchange water from which carbon dioxide was completely removed, adjusted to have a concentration of 400 mmol/l and 25.5 mol/l, respectively, and then kept at 90° C. under argon bubbling. The electrolytically formed tantalum foil obtained above was dipped in these solutions under argon bubbling, reacted for 4 hours and then washed with ion exchange water from which carbon dioxide was removed, thereby obtaining an electrode material for capacitors. The metal elements present in the tantalic acid compound formed on the surface of the manufactured electrode material were identified as strontium, barium and tantalum. The capacitance value of this electrode material is shown in Table 2.

EXAMPLE 2

An electrode material for capacitors was obtained in the same manner as in Example 1 except that a niobium plate (thickness: 0.2 mm, size: 10 mm×10 mm) was used in place of the tantalum foil, 2 mol/l of sodium hydroxide was used in place of strontium hydroxide, the barium hydroxide concentration was changed to 0.1 mol/l and the reaction was performed at a solution temperature of 85° C. for 1 hour in Example 1. The metal elements present in the niobic acid compound formed on the surface of the niobium plate were identified as barium, sodium and niobium. Also, the layer comprising an oxide of niobium and the niobic acid compound layer formed on the niobium plate of the electrode material were confirmed to have a thickness of about 80 Å and about 350 Å, respectively, by SIMS (secondary ion mass spectrometric analysis) analysis profile in the thickness direction. The capacitance value of this electrode material is shown in Table 2.

EXAMPLE 3

An alloy having a composition containing 86 wt % of niobium and 14 wt % of zirconium was hydrogenated and then pulverized to obtain a powdered alloy (average particle size: 5.2 μm). Subsequently, 0.03 g of this powder was molded together with 0.2 mmφ niobium bar into a size of 2 mm×3 mm×1.2 mm and then vacuum sintered at $10^{-5}$ Torr and 1,000° C. for 20 minutes to obtain a sintered body.

Separately, ion exchange water filled in a Teflon-made container was boiled to remove carbon dioxide and then kept at 85° C. In this ion exchange water filled in the container, a high-purity barium oxide obtained by igniting barium carbonate was dissolved to prepare 0.4 mol/l of a solution. Subsequently, this solution was allowed to stand in an argon atmosphere and using the sintered body obtained above as an anode and platinum as a cathode, an electrolytic oxidation was performed by applying a voltage of 20 [V] for 100 minutes. Thereafter, the formed product was thoroughly washed with ion exchange water from which carbon dioxide was removed, to obtain an electrode material for capacitors. The metal elements present in the niobic acid compound formed on the surface of the sintered body of the electrode material were identified as barium, zirconium and niobium. The capacitance value of this electrode material is shown in Table 2.

EXAMPLES 4 TO 6

Electrode materials for capacitors were obtained in the same manner as in Example 3 except that the kind and composition of the alloy, the kind and concentration of the compound for forming an alkali solution, and the electrolysis conditions were changed as shown in Table 1. In Example 4, the metal elements present in the niobic acid compound formed on the surface of the sintered body of the electrode material were identified as strontium, bismuth and niobium. In Example 5, the metal elements present in the niobic acid compound formed on the surface of the sintered body of the electrode material were identified as sodium, barium, yttrium and niobium. In Example 6, the metal elements present in the niobic acid compound formed on the surface of the sintered body of the electrode material were identified as barium, tin and niobium. The capacitance values of these electrode materials are shown in Table 2.

TABLE 1

| | Alloy | | Conditions for Electrolysis | | | |
|---|---|---|---|---|---|---|
| | Composition Ratio, molar ration | Aqueous Alkali Solution | Concentration [mol/ ] | Solution Temperature | Voltage [V] | Time [hr] |
| Example 4 | Niobium:bismuth = 1:1 | Strontium hydroxide | 0.2 | 80 | 20 | 10 |
| Example 5 | Niobium:yttrium = 10:0.7 | Sodium hydroxide Barium hydroxide | 1 0.75 | 70 | 30 | 5 |
| Example 6 | Niobium:tin = 2:1 | Barium hydroxide | 0.2 | 90 | 15 | 0.4 |

COMPARATIVE EXAMPLE 1

An electrode material for capacitors was manufactured in the same manner as in Example 2 except that the niobic acid compound was not formed on the surface, that is, the reaction treatment in the sodium hydroxide and barium hydroxide solutions was not performed in Example 2. The capacitance value of this electrode material is shown in Table 2.

COMPARATIVE EXAMPLE 2

An electrode material for capacitors was obtained in the same manner as in Example 3 except that the electrolytic oxidation treatment was performed in an aqueous 0.1% phosphoric acid solution in place of the electrolysis in an alkali solution in Example 3. The capacitance value of this electrode material is shown in Table 2.

TABLE 2

| | Capacitance [$\mu$F] |
|---|---|
| Example 1 | 10 |
| Example 2 | 21 |
| Example 3 | 190 |
| Example 4 | 120 |
| Example 5 | 90 |
| Example 6 | 150 |
| Comparative Example 1 | 4.4 |
| Comparative Example 2 | 30 |

EXAMPLES 7 TO 10

40 units of electrode materials for capacitors were manufactured in the same manner as in Example 3. At this time, the acid compound was continuously formed for the 40 electrode materials without exchanging the barium oxide solution prepared. Thereafter, the other part electrode was formed by the method shown in Table 3. Furthermore, a carbon layer and a silver paste layer were laminated thereon in this order. The thus-laminated product was placed on a lead frame and the entire body exclusive of a part of the lead was sealed with an epoxy resin to manufacture 10 chip capacitors. The evaluation results are shown in Table 4.

TABLE 3

| | Other Part Electrode | Formation Method of Electrode |
|---|---|---|
| Example 7 | Mixture of lead dioxide and lead sulfate | Oxidation reaction in lead acetate solution was repeated. |
| Example 8 | Manganese dioxide | Heat decomposition reaction of manganese sulfate was repeated. |
| Example 9 | Chloranile complex of tetrathiotetracene | Operation of dipping in a solution of the compound for other part electrode and then drying was repeated. |
| Example 10 | Polypyrrole doped with aromatic sulfonic acid | Oxidation reaction in a pyrrole solution was repeated. |

COMPARATIVE EXAMPLE 3

After 10 units of electrode materials for capacitors were prepared in the same manner as in Comparative Example 2, chip capacitors were manufactured in the same manner as in Example 7. The evaluation results are shown in Table 4.

TABLE 4

| | Capacitance [$\mu$F] | Leakage current [$\mu$A] |
|---|---|---|
| Example 7 | 120 | 125 |
| Example 8 | 80 | 106 |
| Example 9 | 70 | 96 |
| Example 10 | 100 | 110 |
| Comparative Example 3 | 22 | 73 |

In the Table, the values are an average value of n=10 in respective Examples and Comparative Examples.

From comparison of Examples 1 and 2 with Comparative Example 1 and comparison of Example 3 with Comparative Example 2 in Table 2, it is seen that the electrode material for capacitors of the present invention is a material capable of ensuring a large capacitance. Furthermore, from comparison of Examples 7 to 10 with Comparative Example 3 in Table 4, it is seen that when a capacitor is manufactured using the electrode material for capacitors of the present invention, the capacitance is increased by 3 to 6 times, though the leakage current value worsens to some extent.

INDUSTRIAL APPLICABILITY

When the electrode material for capacitors of the present invention is used for a capacitor, the capacitor produced can have a large capacitance per unit weight without worsening the leakage current value of the capacitor. Furthermore, when an electrode material in which a dielectric layer is formed by the electrolytic oxidation in an alkali solution is used, the dielectric material can be continuously formed without exchanging the raw material solution on each operation, therefore, a batch processing is not necessary and good productivity can be attained.

What is claimed is:

1. An electrode material for capacitors obtained by reacting a tantalum metal, niobium metal or tantalum-niobium composite metal having a dielectric oxide on the surface thereof with an alkali solution to convert at least a part of said dielectric oxide into a tantalic acid compound, niobic acid compound or a composite material of tantalic acid compound and niobic acid compound.

2. The electrode material for capacitors as claimed in claim 1, wherein the alkali solution contains at least one element selected from the group consisting of an alkali metal and an alkaline earth metal.

3. The electrode material for capacitors as claimed in claim 1, wherein the tantalum metal, niobium metal or tantalum-niobium composite metal having a dielectric oxide on the surface thereof is formed by an electrolytic oxidation using a tantalum metal, a niobium metal or a tantalum-niobium composite metal as an anode.

4. An electrode material for capacitors, comprising a tantalum metal, niobium metal or tantalum-niobium composite metal having formed on the surface thereof a tantalic acid compound, a niobic acid compound or, a tantalic acid compound-niobic acid composite compound by an electrolytic oxidation using said metal as an anode in an alkali solution containing at least one element selected from the group consisting of an alkali metal and an alkaline earth metal.

5. An electrode material for capacitors, comprising a tantalum metal having on the surface thereof a dielectric layer comprising an oxide of said metal and a tantalic acid compound.

6. An electrode material for capacitors, comprising a niobium metal having on the surface thereof a dielectric layer comprising an oxide of said metal and a niobic acid compound.

7. An electrode material for capacitors, comprising a tantalum-niobium composite metal having on the surface thereof a dielectric layer comprising an oxide of said metal and a composite material of tantalic acid compound and niobic acid compound.

8. The electrode material for capacitors as claimed in any one of claims 1 to 7, wherein the metal is a sintered body.

9. The electrode material for capacitors as claimed in claim 1, wherein the tantalum metal is an alloy consisting of tantalum and at least one element selected from the group consisting of Group 3A elements, Group 4A elements, Group 3B elements, Group 4B elements and Group 5B elements in the Periodic Table.

10. The electrode material for capacitors as claimed in claim 1, wherein the niobium metal is an alloy consisting of niobium and at least one element selected from the group consisting of Group 3A elements, Group 4A elements, Group 3B elements, Group 4B elements and Group 5B elements in the Periodic Table.

11. The electrode material for capacitors as claimed in claim 1, wherein the tantalum-niobium composite metal is an alloy consisting of tantalum, niobium and at least one element selected from the group consisting of Group 3A elements, Group 4A elements, Group 3B elements, Group 4B elements and Group 5B elements in the Periodic Table.

12. An electrode material for capacitors, comprising an alloy having formed on the surface thereof a dielectric layer comprising an oxide of the elements constituting said alloy and a tantalic acid compound, said alloy consisting of tantalum and at least one element selected from Group 3A elements, Group 4A elements, Group 3B elements, Group 4B elements and Group 5B elements in the Periodic Table.

13. An electrode material for capacitors, comprising an alloy having formed on the surface thereof a dielectric layer comprising an oxide of the elements constituting said alloy and a niobic acid compound, said alloy consisting of niobium and at least one element selected from Group 3A elements, Group 4A elements, Group 3B elements, Group 4B elements and Group 5B elements in the Periodic Table.

14. An electrode material for capacitors, comprising an alloy having formed on the surface thereof a dielectric layer comprising an oxide of the elements constituting said alloy and a composite material of tantalum acid compound and niobic acid compound, said alloy consisting of a tantalum-niobium composite metal and at least one element selected from Group 3A elements, Group 4A elements, Group 3B elements, Group 4B elements and Group 5B elements in the Periodic Table.

15. The electrode material for capacitors as claimed in any one of claims 9 to 14, wherein the alloy is a sintered body.

16. A capacitor comprising the electrode material described in any one of claims 1 to 7 and 9 to 14 and an electrode formed on the dielectric layer of said electrode material.

17. A capacitor comprising the electrode material described in claim 15 and an electrode formed on the dielectric layer of said electrode material.

18. A capacitor comprising the electrode material described in claim 8 and an electrode formed on the dielectric layer of said electrode material.

* * * * *